(12) United States Patent
Liu

(10) Patent No.: US 7,014,203 B2
(45) Date of Patent: Mar. 21, 2006

(54) KICK STAND ASSEMBLY FOR A BABY STROLLER

(76) Inventor: Dong-Shuei Liu, No. 36, Lane 76, Hezuo St., Fongyuan City, Taichung County (TW)

( * ) Notice: Subject to any disclaimer, the term of this patent is extended or adjusted under 35 U.S.C. 154(b) by 80 days.

(21) Appl. No.: 10/754,527

(22) Filed: Jan. 12, 2004

(65) Prior Publication Data

US 2005/0151348 A1    Jul. 14, 2005

(51) Int. Cl.
*B62B 7/08*     (2006.01)
(52) U.S. Cl. ............. 280/293; 280/642; 280/647; 280/763.1
(58) Field of Classification Search ............. 280/1.5, 280/763.1, 47.33, 47.2, 293, 304, 298, 642, 280/647, 301, 650, 755; 248/434, 170
See application file for complete search history.

(56) References Cited

U.S. PATENT DOCUMENTS

| | | | |
|---|---|---|---|
| 878,546 A * | 2/1908 | Lyon | 280/5.3 |
| 1,066,034 A * | 7/1913 | Nauts | 280/650 |
| 1,718,962 A * | 7/1929 | Kimball | 280/655 |
| 2,353,326 A * | 7/1944 | Troendle | 280/755 |
| 2,456,250 A * | 12/1948 | Boudreau | 280/763.1 |
| 2,474,804 A * | 6/1949 | Schwarzbaum | 188/20 |
| 4,846,486 A * | 7/1989 | Hobson | 280/47.25 |
| 5,090,724 A * | 2/1992 | Fiore | 280/643 |
| 6,273,451 B1 * | 8/2001 | Julien et al. | 280/642 |
| 6,318,745 B1 * | 11/2001 | Sharp, III | 280/303 |
| 6,378,890 B1 * | 4/2002 | Cheng | 280/642 |
| 6,382,652 B1 * | 5/2002 | Cheng | 280/293 |

FOREIGN PATENT DOCUMENTS

| DE | 3728292 | * | 4/1988 |
|---|---|---|---|
| EP | 0046736 | * | 3/1982 |

* cited by examiner

*Primary Examiner*—Anne Marie Boehler

(57) ABSTRACT

A kick stand assembly for a baby stroller includes a first link and a second link respectively connected to a rear post of the baby stroller and a kick stand has one end pivotably connected to the first link and the second link is pivotably connected to a mediate portion of the kick stand. When the stroller is folded, the kick stand is stretched outward by pivoting the first and second links, and the other end of the kick stand contacts the ground. The folded stroller is then supported on the kick stand.

4 Claims, 6 Drawing Sheets

KICK STAND ASSEMBLY FOR A BABY STROLLER

FIELD OF THE INVENTION

The present invention relates to a kick stand assembly of a baby stroller and the assembly is pivotably connected to at least one of the two rear posts so as to maintain the folded stroller to stand upright.

BACKGROUND OF THE INVENTION

A conventional baby stroller generally includes a frame composed of primarily two rear posts and two front posts, a seat portion is connected between the two front posts, and two handles connected to the two sides of the seat portion. Each of the front posts and the rear posts has a wheel. A plurality of links are pivotably connected between the two respective front posts and the two respective rear posts on the two sides of the stroller, such that the stroller can be folded to be a compact assembly which is convenient to be carried and stored. Nevertheless, the stroller cannot stand up by its own, the user has to lean it against a wall and remember to lock the wheels to keep the stroller in position. The folded stroller is easily to fall with a slightly touch which can be happened a person or even a pet passing by. This is not convenient for the user who grabs other objects at hands and/or cannot find a fixed object upon which the stroller can lean.

The present invention intends to provide a kick stand assembly that is pivotably connected to the rear post of the stroller and includes a kick stand which supports the stroller on the ground.

SUMMARY OF THE INVENTION

The present invention relates to a kick stand assembly for a baby stroller and comprises a first link having a first end pivotably connected to a rear post of the stroller and a kick stand has a first end thereof pivotably connected to a second end of the first link. A second link has a first end pivotably connected to the rear post and the first end of the second link is located below the first end of the first link. A second end of the second link is pivotably connected to the kick stand. A spring has an end connected to the rear post and the other end of the spring is connected to the second link.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
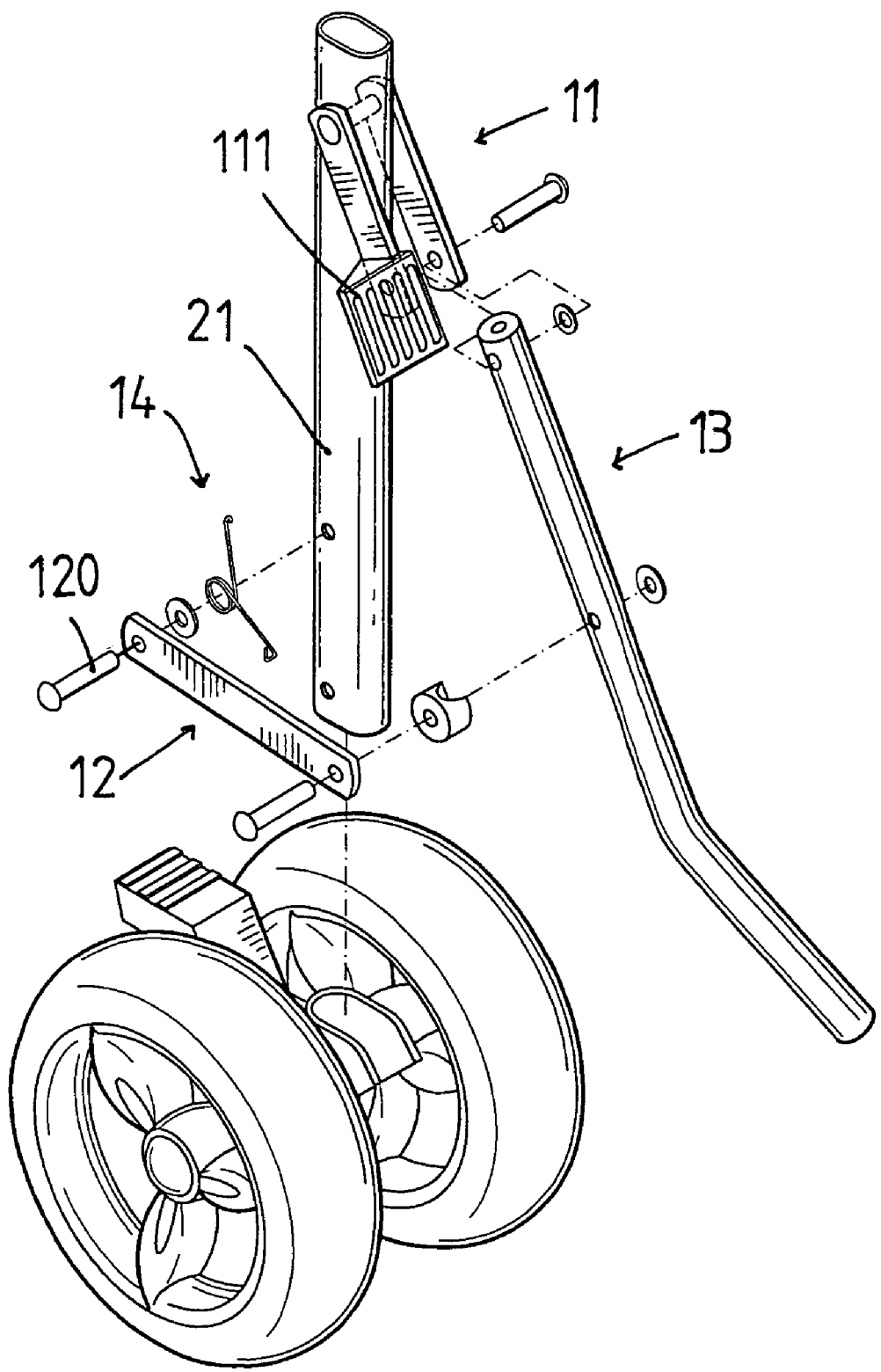
FIG. 1 is an exploded view to show the kick stand assembly of a baby stroller.
Figure 2:
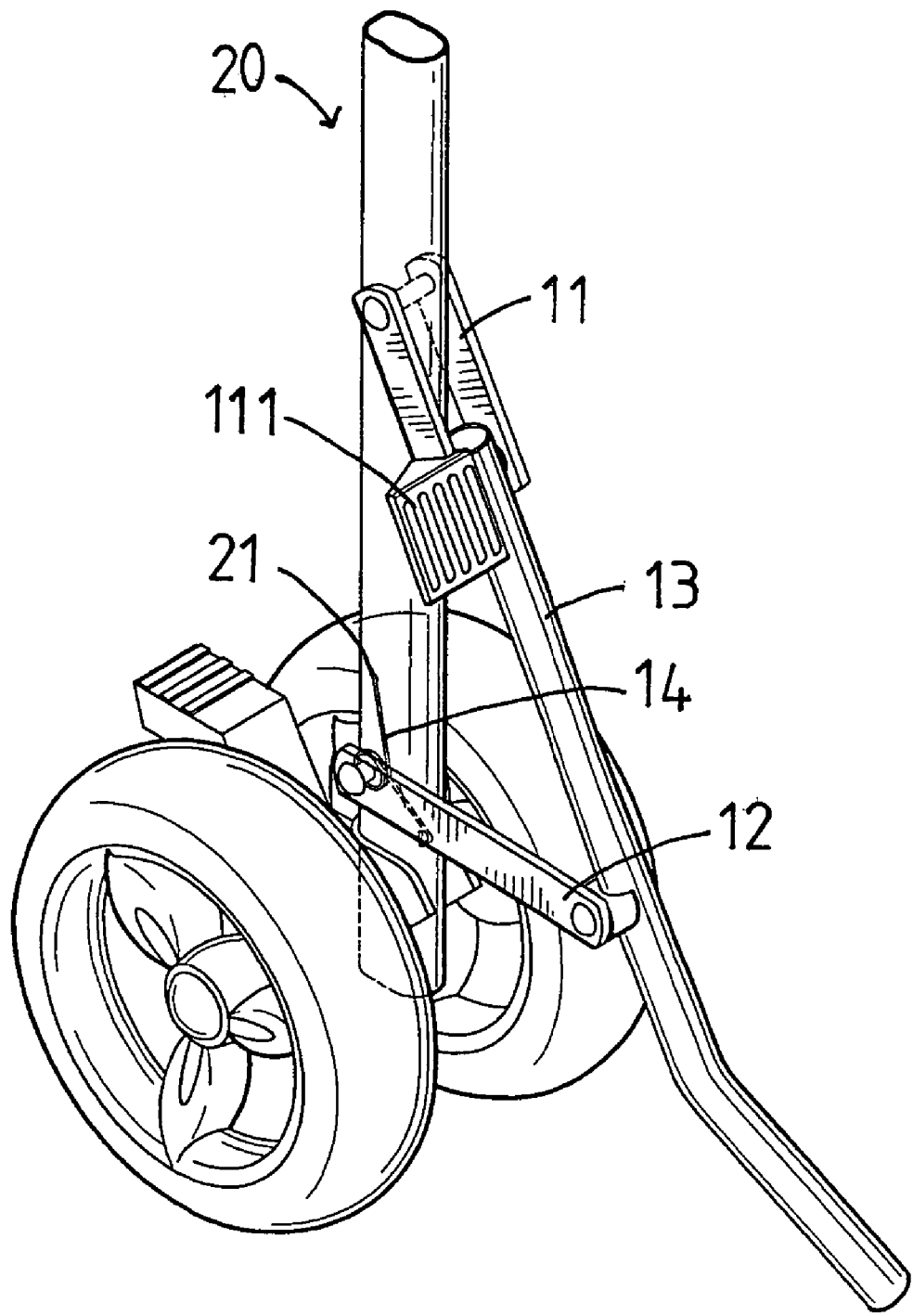
FIG. 2 shows that the kick stand is stretched outward.
Figure 3:
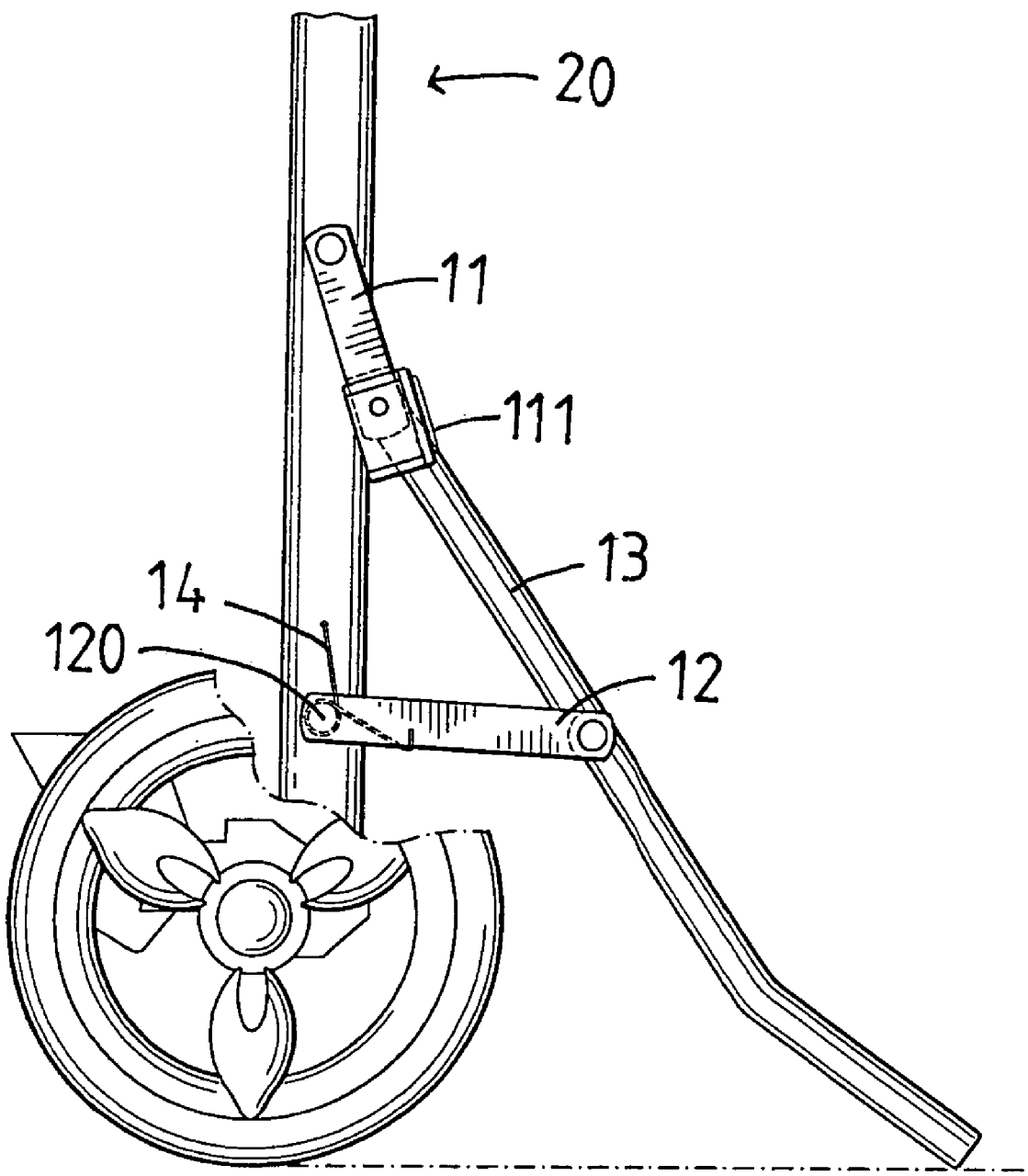
FIG. 3 shows a side view to show the kick stand is stretched out and contacts the ground.
Figure 5:
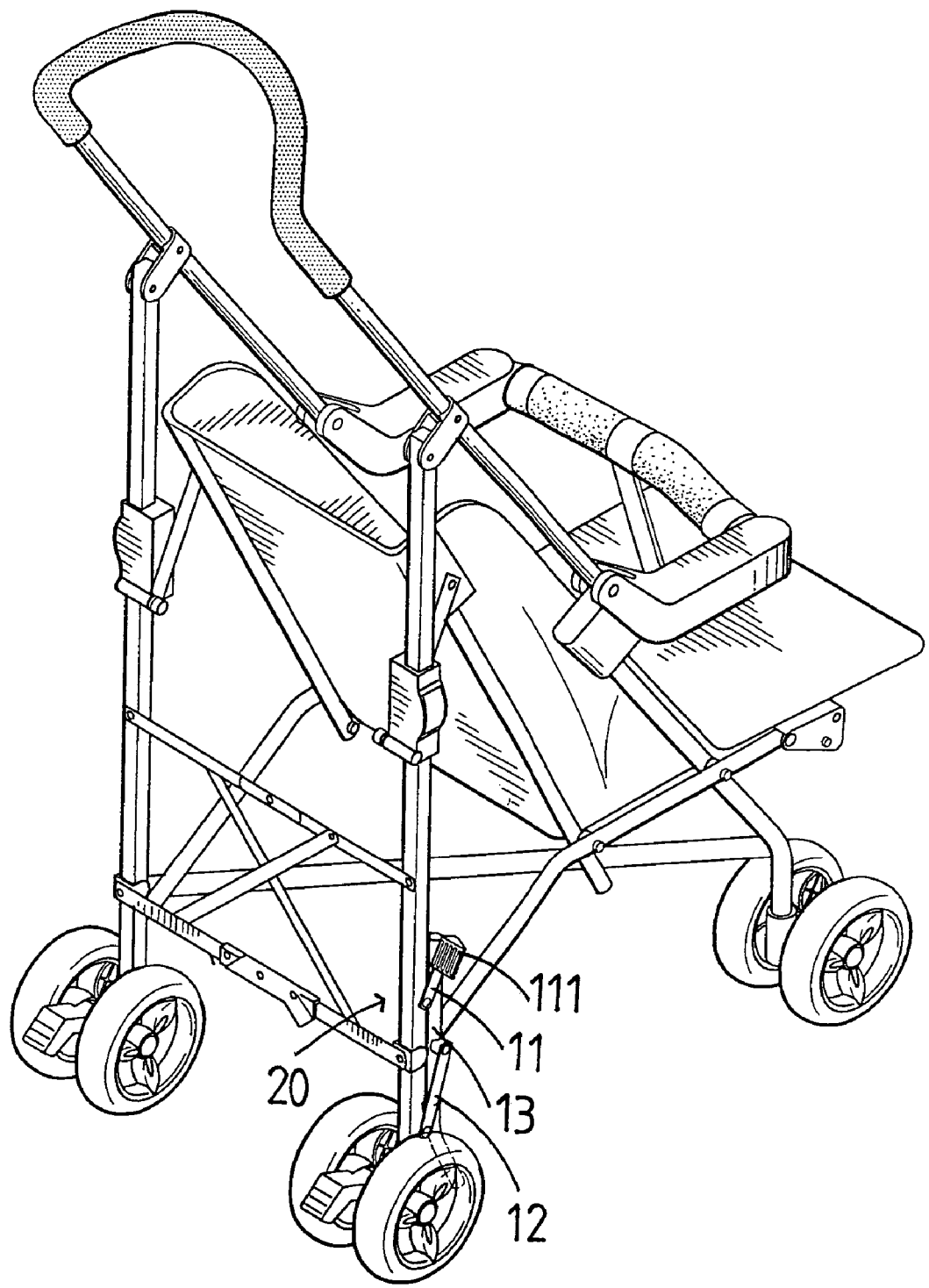
FIG. 5 shows the baby stroller with the folded kick stand.
Figure 6:
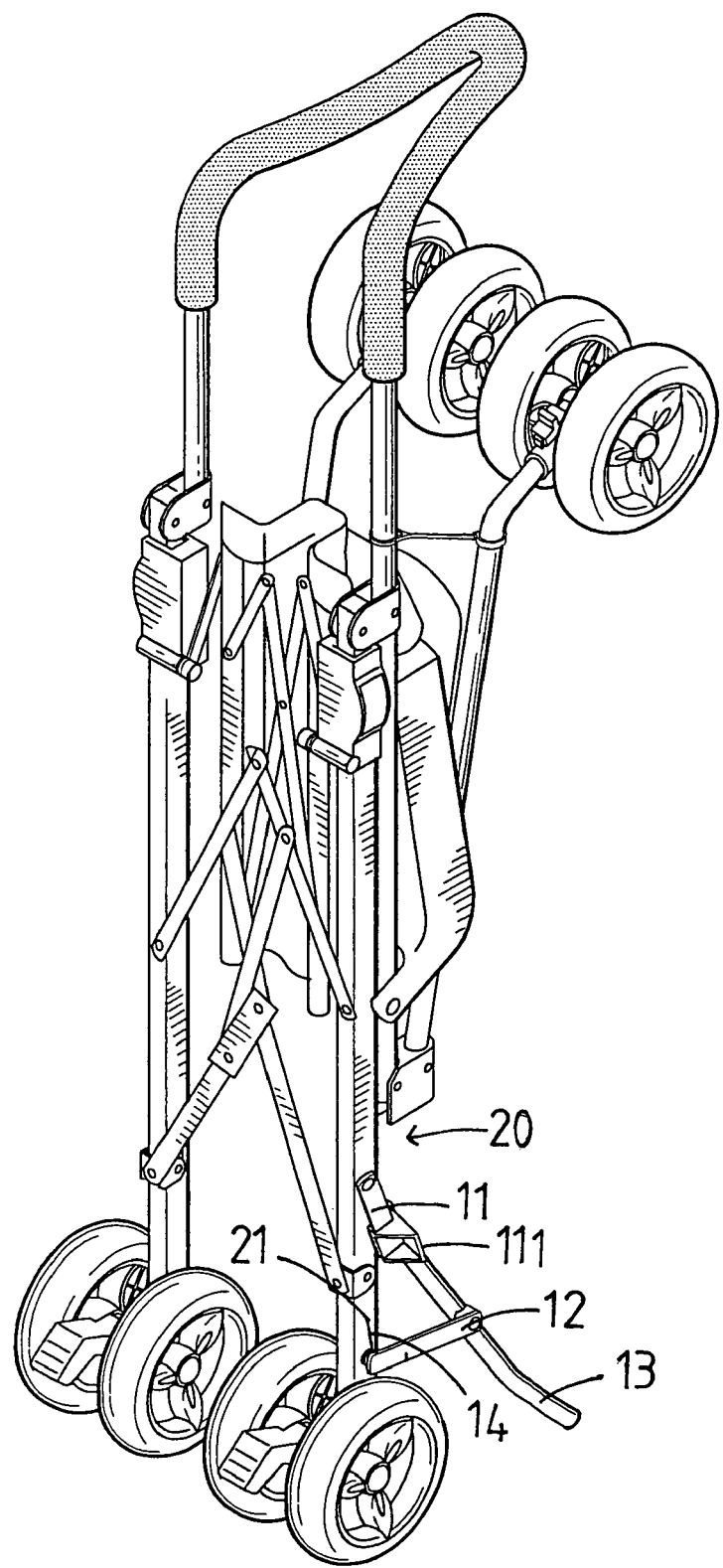
FIG. 6 shows the folded baby stroller with the kick stand being pivoted upward.

Referring to FIGS. 1 to 3, the kick stand assembly for a baby stroller of the present invention comprises a first link 11 having a first end pivotably connected to a rear post 20 of the stroller as shown in FIGS. 5 and 6. The first link 11 includes two plates between which the rear post 20 is located and a pin extends through the two plates and the rear post 20. A pedal 111 is located on a side of the first link 11 such that the user may conveniently push the first link 11 downward. A first end of a kick stand 13 is pivotably connected to a second end of the first link 11 by a pin.

A second link 12 has a first end pivotably connected to the rear post 20 by extending a pin 120 through the first end of the second link 12 and connected to the rear post 20. The pin 120 is located below the first end of the first link 11. A second end of the second link 12 is pivotably connected to a mediate portion of the kick stand 13. A spring 14 which is a torsion spring, is mounted to the pin 120 and includes two ends. One end of the torsion spring 14 is engaged with a hole 21 defined in the rear post 20 and the other end of the spring 14 is connected to the second link 12.

As shown in FIG. 6, when the baby stroller is folded, the user may push the pedal 111 downward by a foot or simply pull the kick stand 13 outward, the first link 11 is pivoted downward to lower the first end of the kick stand 13 to a position that is lower than the first end of the first link 11 and the second link 12 is positioned in horizontal direction to stretch the kick stand 13 outward. The kick stand 13 is now in an operational position and a second end of the kick stand 13 contacts a ground as shown in FIG. 3. Therefore, the weight of the baby stroller can be supported on the kick stand 13 as shown in FIG. 6.

Figure 4:
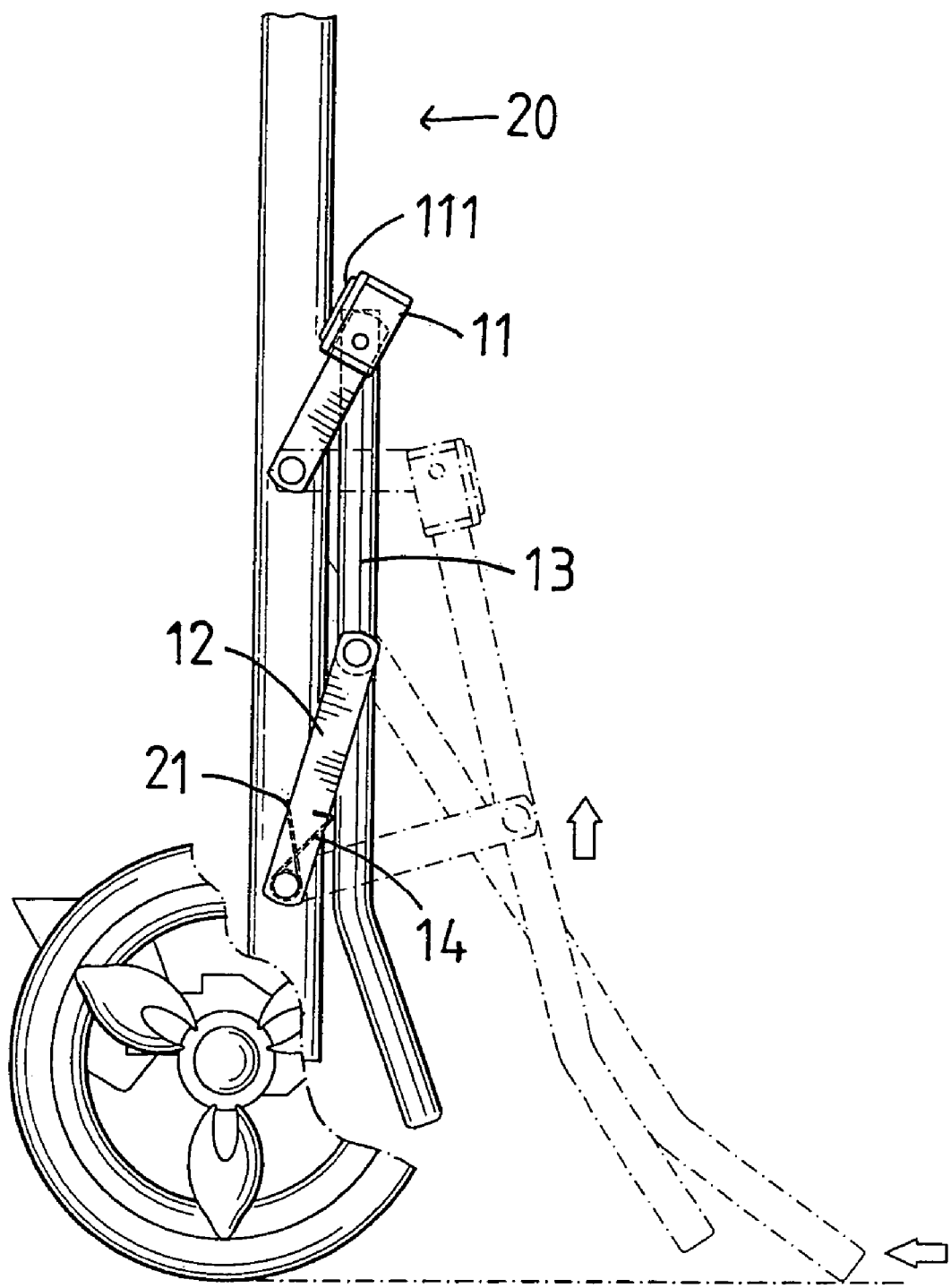
FIG. 4 shows the kick stand is pivoted upward and lifted from the ground.

When the user wants to use the baby stroller, as shown in FIGS. 4 and 5, the first link 11 is pivoted upward to lift the first end of the kick stand 13 to a position that is higher than the first end of the first link 11 and the second link 12 is pivoted upward to pull the kick stand 13 inward. The kick stand 13 is now in a folding position and the second end of the kick stand 13 is lifted from a ground. The torsion spring 4 keeps the second link 12 to be the position as shown in FIG. 4 such that the kick stand 13 is kept at its folding position.

While we have shown and described the embodiment in accordance with the present invention, it should be clear to those skilled in the art that further embodiments may be made without departing from the scope of the present invention.

What is claimed is:

1. A kick stand assembly for a baby stroller, comprising:
    a first link having a first end adapted to be pivotably connected to a rear post of the stroller, a kick stand having a first end pivotably connected to a second end of the first link, a pedal located on a side of the first link;
    a second link having a first end adapted to be pivotably connected to the rear post by extending a pin through the first end of the second link and adapted to be connected to the rear post, the pin located below the first end of the first link, a second end of the second link pivotably connected to the kick stand, and
    a spring having an end adapted to be connected to the rear post and the other end of the spring connected to the second link.

2. The assembly as claimed in claim 1, wherein the spring is a torsion spring which is mounted to the pin extending through the first end of the second link.

3. The assembly as claimed in claim 1, wherein the first link is pivoted downward to lower the first end of the kick stand to a position that is lower than the first end of the first link and the second link is positioned in horizontal direction to stretch the kick stand outward when the kick stand in an operational position, a second end of the kick stand contacts a ground.

4. The assembly as claimed in claim 1, wherein the first link is pivoted upward to lift the first end of the kick stand to a position that is higher than the first end of the first link and the second link is pivoted upward to pull the kick stand inward when the kick stand in a folding position, a second end of the kick stand is lifted from a ground.

* * * * *